United States Patent
Taira (10) Patent No.: US 10,528,041 B2
(45) Date of Patent: Jan. 7, 2020

(54) MACHINING TIME ESTIMATION DEVICE

(71) Applicant: FANUC Corporation, Yamanashi (JP)

(72) Inventor: Ryousuke Taira, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 185 days.

(21) Appl. No.: 15/423,772

(22) Filed: Feb. 3, 2017

(65) Prior Publication Data

US 2017/0227952 A1     Aug. 10, 2017

(30) Foreign Application Priority Data

Feb. 4, 2016   (JP) .................................. 2016-019714

(51) Int. Cl.
    *G05B 23/00*         (2006.01)
    *G05B 19/4069*       (2006.01)

(52) U.S. Cl.
    CPC ......... *G05B 23/00* (2013.01); *G05B 19/4069* (2013.01); *G05B 2219/31407* (2013.01); *G05B 2219/37336* (2013.01)

(58) Field of Classification Search
    CPC ................ G05B 23/00; G05B 19/4069; G05B 2219/31407; G05B 2219/37336
(Continued)

(56) References Cited

U.S. PATENT DOCUMENTS

| 5,514,941 A * | 5/1996 | Kita ........................ B23H 7/04 318/569 |
| 2004/0186614 A1 | 9/2004 | Yamaguchi et al. |

(Continued)

FOREIGN PATENT DOCUMENTS

| JP | H4-314104 A | 11/1992 |
| JP | H11-282520 A | 10/1999 |

(Continued)

OTHER PUBLICATIONS

Office Action in JP Application No. 2016-019714, dated Mar. 6, 2018, 6pp.

(Continued)

*Primary Examiner* — Kenneth M Lo
*Assistant Examiner* — Michael W Choi
(74) *Attorney, Agent, or Firm* — Hauptman Ham, LLP (57) ABSTRACT

The object of the present invention is to provide a machining time estimation device for reducing the time required for estimating the machining time. The device comprises storage for storing machining program and machining setting, and machining information acquiring unit for acquiring machining information on an operating condition of a machine tool adapted to be controlled on the basis of the machining program and machining setting. The device further comprises varied element extraction unit for extracting an element varied between a plurality of said machining settings, effected block extraction unit for extracting an effected block the machining time is varied on the effect of the varied element, estimated reduction in time calculating unit for calculating on each effected block difference caused by the varied element and calculating estimated difference in time throughout the machining program, and machining time display unit for outputting the estimated difference in time.

11 Claims, 4 Drawing Sheets

(58) Field of Classification Search
USPC .......................................................... 700/108
See application file for complete search history.

(56) References Cited

U.S. PATENT DOCUMENTS

| | | | | |
|---|---|---|---|---|
| 2006/0065638 | A1* | 3/2006 | Sasaki | B23H 7/20 219/69.13 |
| 2012/0109359 | A1* | 5/2012 | Mizuno | G05B 19/41865 700/173 |
| 2015/0127480 | A1* | 5/2015 | Herrman | G06Q 30/0283 705/26.4 |
| 2016/0091886 | A1* | 3/2016 | Sato | G05B 19/416 700/188 |
| 2016/0154404 | A1* | 6/2016 | Saitou | G05B 19/4155 700/159 |

FOREIGN PATENT DOCUMENTS

| | | | |
|---|---|---|---|
| JP | H11282520 A | * | 10/1999 |
| JP | 2012-93975 A | | 5/2012 |

OTHER PUBLICATIONS

Office Action in DE Application No. 10 2017 101 711.9, dated Oct. 25, 2019, 11pp.

* cited by examiner

MACHINING TIME ESTIMATION DEVICE

RELATED APPLICATIONS

The present application claims priority to Japanese Patent Application Number 2016-019714, filed Feb. 4, 2016, the disclosure of which is hereby incorporated by reference herein in its entirety.

BACKGROUND OF THE INVENTION

Field of the Invention

The present invention relates to a machining time estimation device, more particularly a machining time estimation device for reducing the time required for estimating the machining time.

Description of the Related Art

In the machining of the work by means of machine tool, the productivity can be improved by reducing the machining time required for the series of machining steps. In order to attain the target machining time the operator generally effects the adjustment of the machining setting and the identification of the execution time of NC program reiteratively. The typical methods for identifying the time required for executing the NC program are as follows;
(1) Executing the NC program in the actual machine tool;
(2) Using software for estimating the machining time of the NC program.
In the procedure (1), the time for executing the NC program throughout is necessary for identifying the machining time. Further, the machine tool should be occupied since the actual working of the machine tool is necessary to identify the machining time.

In order to solve such a problem, the procedure (2) is suggested. A method for estimating the machining time of the NC program is disclosed by way of example in Japanese Patent Application Laid-open No. 2012-093975. In accordance with the technical matter disclosed therein, the estimation of the machining time can be made faster than the procedure (1), and no occupation of the machine tool is necessary.

In accordance with the technology disclosed in the Japanese Patent Application Laid-Open No. 2012-093975, the machining time estimation is to be carried out throughout the whole range of operation from the top to the end of the NC program so that there is a problem that the longer the NC program, the longer the time required for estimating the machining time. Even if only a few blocks are effected by the adjustment of the machining setting, the estimation process always needs substantially the same period of time. This does not depend on the number of blocks to be effected by the adjustment of the machining setting. When multiple iterations of the adjustment of the machining setting and the estimation on the machining time for attaining the target machining time, the time required therefor prolonged drastically.

SUMMARY OF THE INVENTION

It is an object of the present invention to solve the problems as mentioned above. Further, the object of the present invention is to provide a machining time estimation device for reducing the time required for estimating the machining time.

The machining time estimation device in accordance with an embodiment of the present invention includes storage for storing machining program and machining setting, and machining information acquiring unit for acquiring machining information on an operating condition of a machine tool adapted to be controlled on the basis of the machining program and machining setting. The device further comprises varied element extraction unit for extracting an element varied between a plurality of said machining settings, effected block extraction unit for extracting an effected block the machining time of which is varied on the effect of the varied element, estimated reduction in time calculating unit for calculating on each effected block difference caused by the varied element and calculating estimated difference in time throughout the machining program, and machining time display unit for outputting the estimated difference in time.

In the machining time estimation device of another embodiment, the estimated reduction in time calculating unit is adapted to calculate an estimated machining time after the adjustment of the machining setting on the basis of the machining time before the adjustment of the machining setting and the estimated difference in time.

In the machining time estimation device of another embodiment, the machining information acquiring unit is adapted to measure on each block the machining time before the adjustment of the machining setting, and the obtained information is stored in the storage as machining information.

In the machining time estimation device of another embodiment, the machining information acquiring unit is adapted to acquire the machining information from the machine tool operated under the machining program and the machining setting.

In the machining time estimation device of another embodiment, the machining information acquiring unit is adapted to acquire the machining information which is the result of simulation on the machining time under the machining program and the machining setting.

In the machining time estimation device of another embodiment, the machining setting includes a setting regarding overlapping, and the estimated reduction in time calculating unit is adapted to calculate the estimated difference in time due to the application of the overlapping.

In the machining time estimation device of another embodiment, the machining setting includes a setting regarding an in-position width, and the estimated reduction in time calculating unit is adapted to calculate the estimated difference in time due to the variation of the in-position width.

In accordance with the present invention, the machining time estimation device for reducing the time required for estimating the machining time can be provided.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Some embodiments of the present invention will now be described in detail with reference to the accompanying drawings. At first, arrangement of machining time estimation device 100 in accordance with the present invention will be described with reference to the block diagram of FIG. 1.

Figure 1:
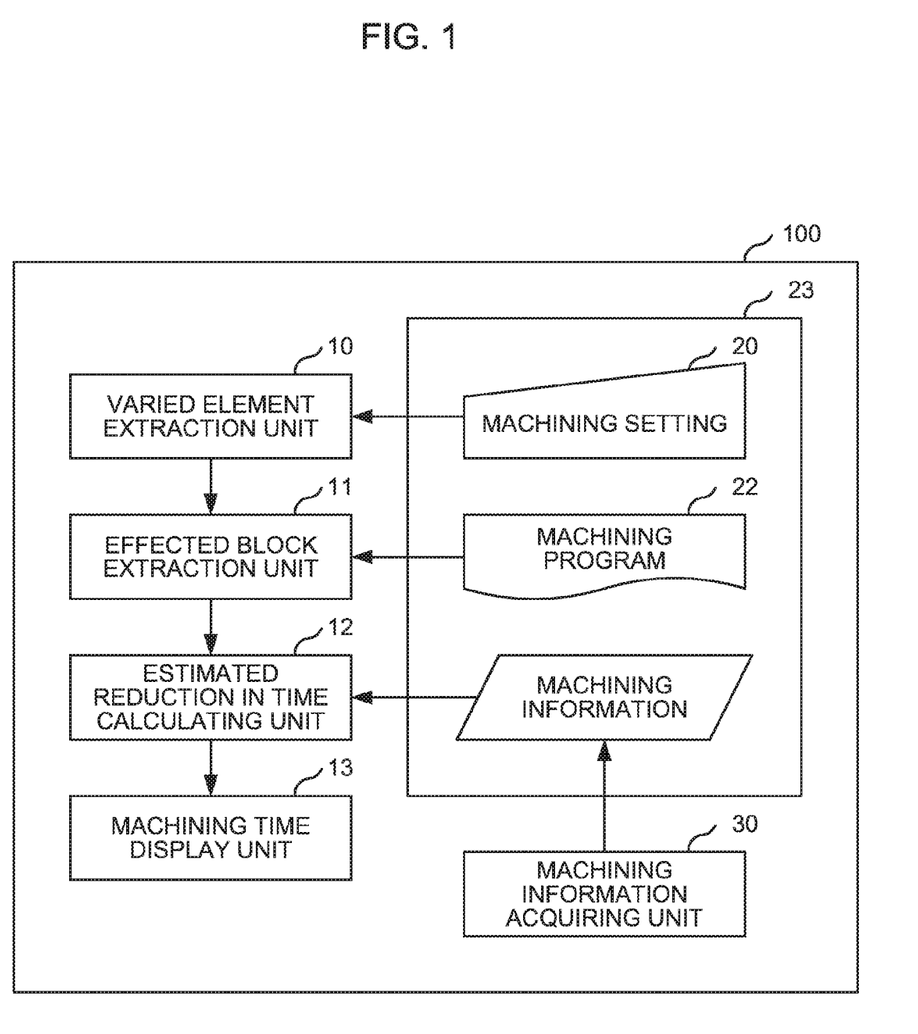
FIG. 1 is a schematic block diagram showing an arrangement of the machining time estimation device.

The machining time estimation device 100 comprises varied element extraction unit 10, effected block extraction unit 11, estimated reduction in time calculating unit 12, machining time display unit 13, storage 23, and machining information acquiring unit 30.

The machining time estimation device 100 may typically be an information processing device such as personal computer or numerical control device. Generally, the machining time estimation device 100 may comprise processor, storage, and I/O device. The processor reads out the program stored in the storage, executes thereof, and control the I/O device to realize logically the above mentioned variety of processing units.

In the storage 23, machining program 22 and machining setting 20 are stored preliminary. The machining program 22 is that for operating the machine tool to make predetermined machining on the work. In the machining setting 20, parameters for customizing the operation of the machining program 22 are included. For example, whether rapid traverse overlap be applied or set value of in-position width may be defined in the machining setting 20. Further, in the embodiments disclosed herein, the storage 23 not necessarily be formed by one storage or storage region. In other words, it can be formed of a plurality of storage or storage region for the distributed storage of data.

Upon executed the machining program 22 in the machine tool, or upon employed machining time estimation software with respect to the machining program 22, the machining information acquiring unit 30 may acquire the machining information showing the operation condition of the machine tool and so on. In the machining information, included are the operation condition of each axis of the machine tool and so on. The machining information acquiring unit 30 accumulates thus obtained machining information in the storage 23.

Upon varied the contents of the machining setting 20, the varied element extraction unit 10 is adapted to extract an element varied across the variation of the setting.

The effected block extraction unit 11 is adapted to specify an effected block in which the machining time is influenced by the varied element extracted by the varied element extraction unit 10.

The estimated reduction in time calculating unit 12 is adapted to calculate the difference between the machining time before the variation of the machining setting 20 in each effected block specified by the effected block extraction unit 11 and the machining time after varied the machining setting 20 on the basis of the machining information stored in the storage 23. Thus estimated time difference is obtained. Then the total amount of differences in time in the machining program 22 may be obtained by adding the difference of each effected block. The estimated reduction in time calculating unit 12 may estimate the machining time after varied the machining setting 20 by subtracting the estimated time difference from the machining time before the variation of the machining setting 20.

The machining time display unit 13 is adapted to output the value calculated in the estimated reduction in time calculating unit 12. The machining time display unit 13 may for example be adapted to output the machining time after varied the machining setting 20 or the estimated time difference. The time display unit 13 may preferably be adapted to display the machining time before the variation of the machining setting 20 at the same time.

Figure 2:
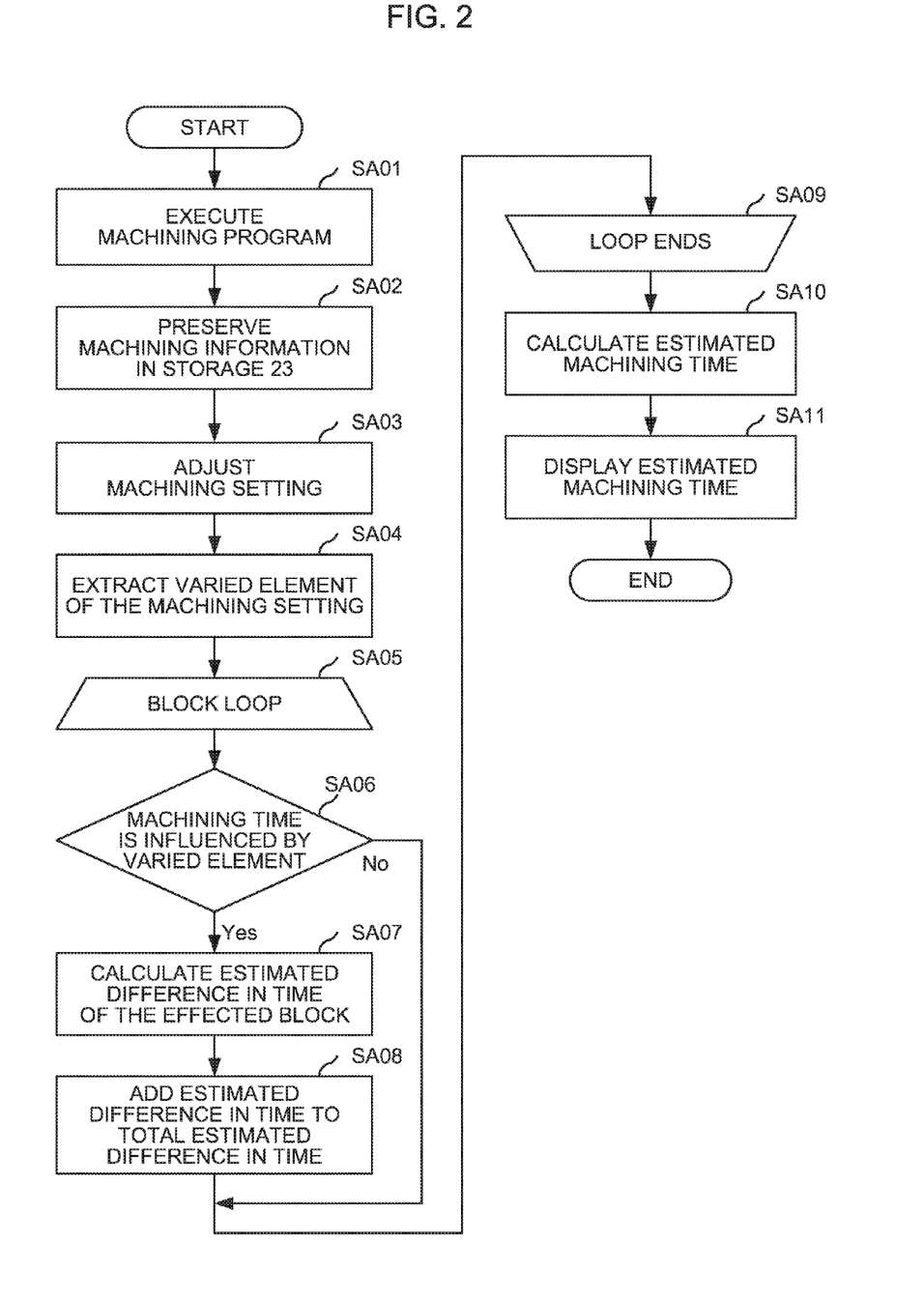
FIG. 2 is a flowchart showing an illustrative flow of an operation of the machining time estimation device.

The process for displaying the machining time estimated in the machining time estimation device 100 will now be described with reference to the flowchart designated in FIG. 2.

[Step SA01]

The operator orders the machining program 22 to run through the actual machine tool. Otherwise, machining time estimation software may be used in the machining program 22. The machining time estimation software effects the process for estimating the machining time to be obtained by running the machining program 22 in virtual machine tool.

[Step SA02]

The machining information acquiring unit 30 is adapted to acquire the machining information such as operating conditions of each axis of the actual or virtual machining tool upon execution of the machining program 22 on the actual machine tool or upon estimation of the machining time by means of the machining time estimation software. Thus obtained machining information is adapted to be stored in the storage 23. Preferably, the machining information acquiring unit 30 is adapted to preserve the machining information with associating the machining setting 20.

[Step SA03]

The operator adjusts the machining setting 20 of the actual machine tool or the machining time estimation software.

[Step SA04]

The varied element extraction unit 10 may then be adapted to extract the element varied across the adjustment of the machining setting 20 carried out in step SA03. In other words, the unit 10 is adapted to specify which portion of the machining setting 20 had varied.

[Step SA05]

The effected block extraction unit 11 may then be adapted to read out sequentially the blocks included in the machining program 22, and following steps SA06-SA08 are executed on each block sequentially.

[Step SA06]

The effected block extraction unit 11 is adapted to determine whether the machining time of the block read out in step SA05 was influenced by the varied element. In other words, the unit 11 determines whether the machining time of the block had varied through the adjustment of the machining setting 20 in step SA03.

The typical effected block extraction unit 11 is adapted to preserve the kind of the varied element in association with the information on the block effected by the variation of the element, so that the effected block extraction unit 11 can specify the effected block on the basis of the varied element extracted in step SA04.

Upon effected the machining time, the process proceeds to step SA07, and when no effects are prevailed in its machining time, it will proceed to step SA09.

[Step SA07]

The estimated reduction in time calculating unit 12 is adapted to use the machining information preserved in the storage 23 in step SA02, and calculate the estimated reduction in machining time of the block due to the varied element. Thus how much machining time is to be reduced can be estimated in the block.

In the typical estimated reduction in time calculating unit 12, the kind of the varied element and the method for calculating the estimated difference in time depending on the varied element are preserved in association with each other. The calculation method may typically be a mathematical logic of the estimated difference in time including the above-mentioned machining information as parameters. Thus the estimated difference in time can be calculated in the unit 12.

[Step SA08]

The estimated reduction in time calculating unit 12 is adapted to add the estimated difference in time obtained in step SA07 to the total estimated difference in time of the machining program 22. In other words, if calculated is the estimated difference in time of each block the machining time of which is effected by the varied element, the total estimated difference in time of the machining program 22 can be obtained by adding sequentially the estimated difference in time of each block.

[Step SA09]

Provided the block read out in the step SA05 is the last one of the machining program, the process proceeds to step SA10, otherwise it will return to SA05.

[Step SA10]

The estimated reduction in time calculating unit 12 is adapted to calculate the estimated machining time after the adjustment of the machining settings 20 by subtracting the estimated difference in time obtained in step SA08 i.e. the total estimated difference in time of the machining program 22 from the machining time before the adjustment of the machining setting 20 in Step SA03 (the machining time of the machining program 22 obtained on execution thereof on the actual machine tool or that obtained on estimation of the machining time by means of the machining time estimation software).

[Step SA11]

The machining time display unit 13 is adapted to output the machining time before the adjustment of the machining settings 20 or the estimated machining time, and the estimated difference in time after the adjustment of the machining settings 20 and the estimated machining time. Typically, the display unit 13 is adapted to display the sets of information on display device.

The concrete examples of the calculation of the estimated difference in time after the adjustment of the machining setting 20 by means of the machining time estimation device 100 will now be described. The first embodiment is an example for calculating the estimated difference in time when the machining setting is adjusted to adopt the rapid traverse block overlap. The second embodiment is an example for calculating the estimated difference in time when the machining setting 20 is adjusted to vary the in-position width.

First Embodiment: The Rapid Traverse Block Overlap is Applied

Figure 3:
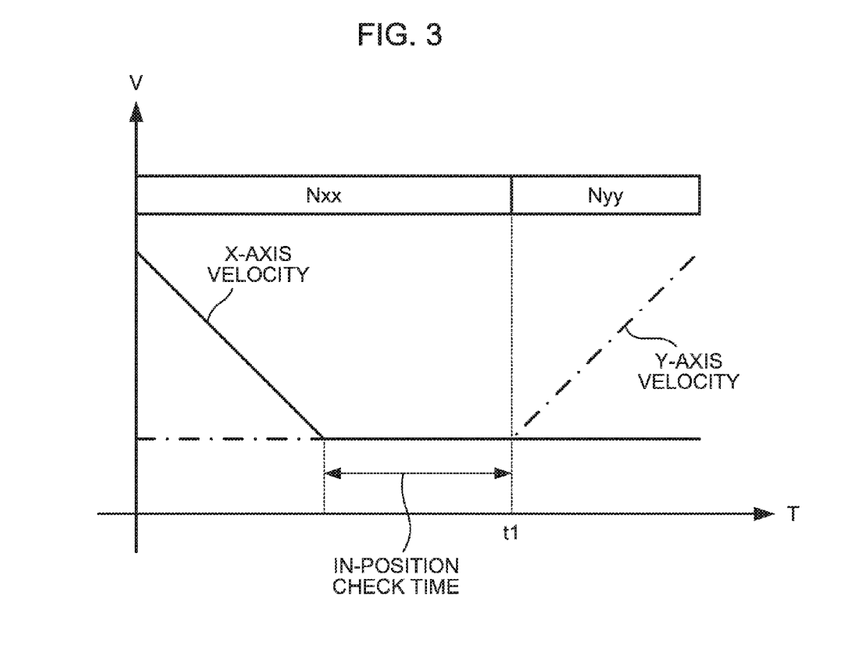
FIG. 3 is a graphic diagram for explaining the process for estimating the machining time upon applied the rapid traverse block overlap.

The machine tool or the machining time estimation software executes the machining program 22 without applying the rapid traverse block overlap. In this case, the machining information acquiring unit 30 is adapted to acquire the machining information from the machine tool and preserve it in the storage 23 sequentially. In this embodiment, the machining information acquiring unit 30 is adapted to acquire sequentially the velocity of X axis in the time T and the velocity of Y axis in the time T. The graph shown in FIG. 3 shows the relation among the time T, the velocity of X axis, and the velocity of Y axis. In the block Nxx, the rapid traverse of X axis is implemented and in-position check is effected after the velocity of X axis becomes zero, then the commencement of the next block Nyy will be implemented.

Figure 4:
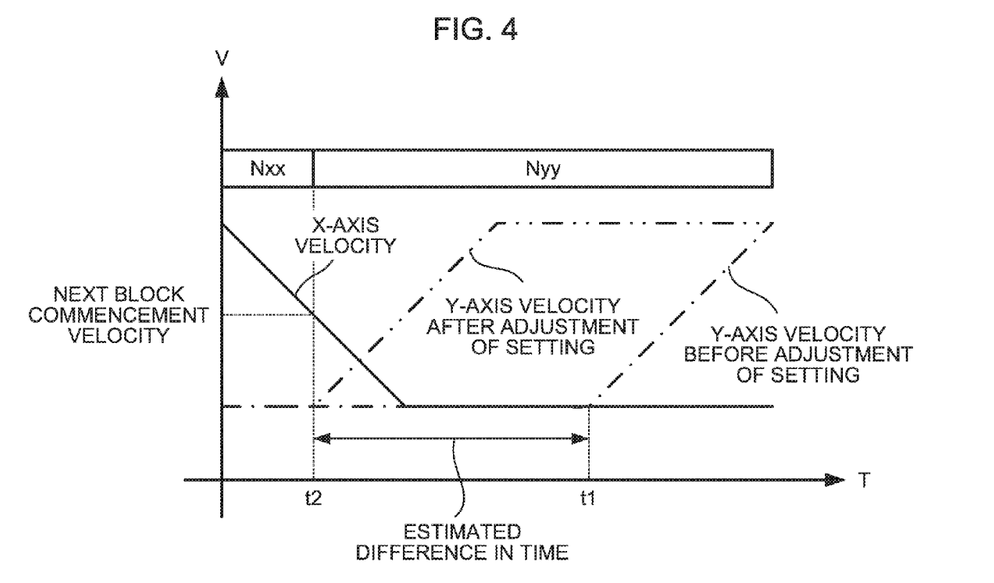
FIG. 4 is a graphic diagram for explaining the process for estimating the machining time upon applied the rapid traverse block overlap.

Then the operator adjusts the machining setting in the machine tool or the machining time estimation software, and applies the rapid traverse block overlap. The machining information to be acquired by the machining information acquiring unit 30 from the machine tool is shown in FIG. 4. As can be seen, when the rapid traverse block overlap is applied, the operation of the next block Nyy will be commenced upon the velocity of X axis in the Nxx block reduced to be equal to or less than the predetermined threshold value.

The effected block extraction unit 11 is adapted to detect the occurrence of the varied element or the variation of the machining setting 20, and start the extraction process of the effected block. In this embodiment, a rule "when the rapid traverse block overlap is applied, the machining time of the block to be overlapped is effected" is preserved preliminary in the effected block extraction unit 11. In this embodiment, the block Nxx is adapted to be overlapped with the next block Nyy through the application of the rapid traverse block overlap. In this connection, the effected block extraction unit 11 determines that the machining time of the block Nxx is influenced.

The estimated reduction in time calculating unit 12 is adapted to calculate the estimated difference in the machining time in block Nxx extracted by the effected block extraction unit 11. In this embodiment, a method for calculating the estimated difference in time when the varied element is the rapid traverse block overlap is preserved in the estimated reduction in time calculating unit 12. The method for calculating the estimated difference in time will be described.

At first, the estimated reduction in time calculating unit 12 specifies the time t1 of the commencement of the block Nyy following the block Nxx from the machining information before the adjustment of the machining setting 20. Then the unit 12 specifies the time t2 of the commencement of the block Nyy following the block Nxx from the machining information after the adjustment of the machining setting 20. The time of the commencement of the next block Nyy after the adjustment of the machining setting 20 can also be obtained as the time t2 when the velocity of the x axis corresponds with the threshold value determined preliminary in the machining setting 20 adopting the rapid traverse block overlap, i.e. the velocity of X axis which triggers the commencement of the next block Nyy. Finally, the estimated reduction in time calculating unit 12 is adapted to calculate the difference between the commencement time t1 of the next block Nyy before the adjustment of the machining setting and the commencement time t2 of the next block Nyy after the adjustment of the machining setting. Thus obtained difference in time is the estimated reduction of the machining time when the rapid traverse block overlap is applied.

Second Embodiment: Variation of In-Position Width

Figure 5:
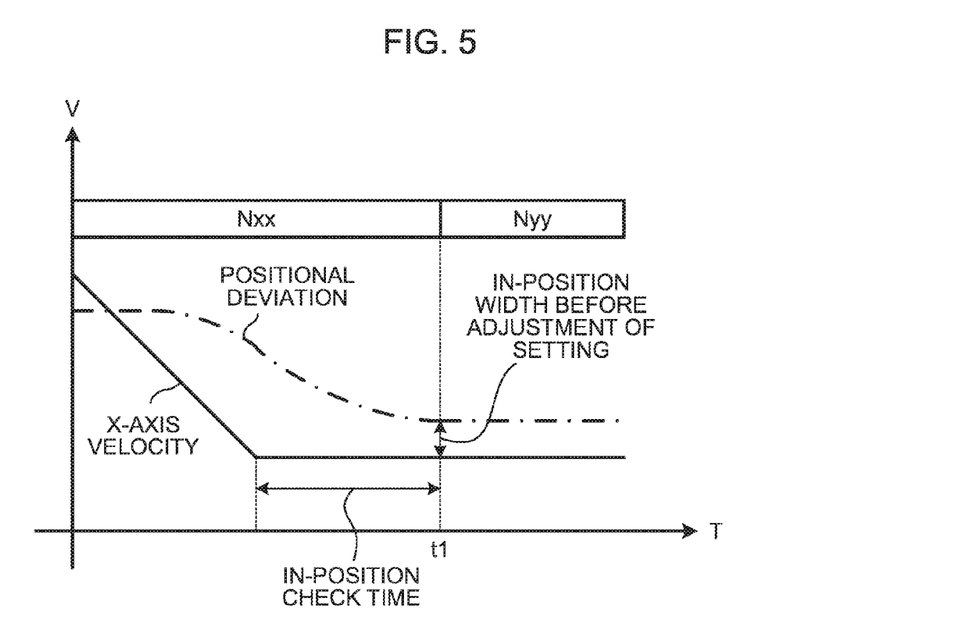
FIG. 5 is a graphic diagram for explaining the process for estimating the machining time when the in-position width is adjusted.

The machining program 22 is executed under the condition that the in-position width is not varied by the machine tool or the machining time estimation software. The machining information acquiring unit 30 is adapted to acquire the machining information from the machine tool or the machining time estimation software and preserves thus obtained information in the storage 23 sequentially. In this embodiment, the machining information acquiring unit 30 is adapted to acquire sequentially the X axis velocity at the time T and the amount of positional deviation from the in-position level at the time T. The relation among the time T, the X axis velocity, and the amount of positional deviation is shown in FIG. 5. The in-position check is effected in the block Nxx. It can be seen that the next block Nyy commences its operation when the amount of positional deviation becomes smaller than the predetermined in-position width.

Figure 6:
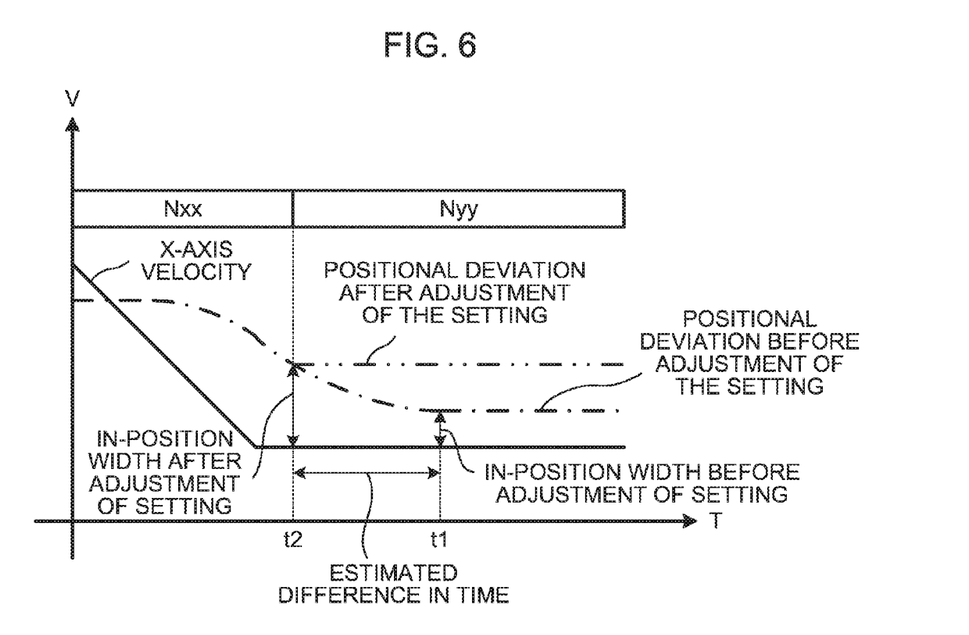
FIG. 6 is a graphic diagram for explaining the process for estimating the machining time when the in-position width is adjusted.

The operator may then increase the set value of the in-position width by adjusting the machining setting 20 in the machine tool or the machining time estimation software. The machining information acquired by the machining information acquiring unit 30 from the machine tool or the machining time estimation software is shown in FIG. 6. The in-position check is effected in the block Nxx. It can be seen that the next block Nyy commences its operation when the amount of positional deviation becomes smaller than the in-position width after the variation of the setting.

The effected block extraction unit 11 is adapted to detect the occurrence of varied element or the variation of the set value of the in-position width, and then commence the process for extracting the effected block. In this embodiment, a rule "when the set value of the in-position width is varied, the machining time of the block including the in-position check is effected" is preserved preliminary in the effected block extraction unit 11. In this embodiment, the effected block extraction unit 11 determines that the machining time of the block Nxx will be effected since the in-position check is effected in the block Nxx.

The estimated reduction in time calculating unit 12 is adapted to calculate the estimated difference in time of the machining time in the block Nxx extracted by the effected block extraction unit 11. In this embodiment, the method for calculating the estimated difference in time when the varied element is the variation of the setting of the in-position width is preserved preliminary in the estimated reduction in time calculating unit 12. The method for calculating the estimated difference in time will be described.

At first, the estimated reduction in time calculating unit 12 specifies the time t1 of the commencement of the block Nyy following the block Nxx from the machining information before the adjustment of the machining setting 20. Then the unit 12 specifies the time t2 of the commencement of the block Nyy following the block Nxx from the machining information after the adjustment of the machining setting 20. The commencement time of the next block Nyy after the adjustment of the machining setting 20 can also be obtained as the time t2 when the amount of positional deviation corresponds with the in-position width after the variation of the setting. Finally, the estimated reduction in time calculating unit 12 is adapted to calculate the difference between the commencement time t1 of the next block Nyy before the adjustment of the machining setting 20 and the commencement time t2 of the next block Nyy after the adjustment of the machining setting 20. Thus obtained difference in time is the estimated reduction in machining time when the set value of the in-position width is varied.

In accordance with the embodiments of the present invention, the estimated machining time can be calculated by means of the machining time estimation device 100 without executing whole machining program 22 again when the adjustment of the machining setting 20 is made. To say more concretely, the machining time estimation device 100 specifies the block influenced by the adjustment of the machining setting 20 and calculates the reduction in time only in thus specified block. In this connection the machining time can be estimated through smaller amount of calculation and shorter time even if the machining program 22 is larger in its size. Thus the time required for the operation for adjusting the machining setting 20 for attaining the target machining time can be reduced.

Further, in accordance with the embodiment of the present invention, the machining time estimation device 100 is adapted to calculate the estimated machining time by subtracting the estimated reduction in time from the machining time obtained by executing preliminary the actual machine tool or machining time estimation software. Thus the estimated machining time reduced in its error to the actual machining time can be calculated.

While this invention has been described in terms of the preferred embodiments thereof, it is not intended to be so limited but rather only to the extent set force in the claims that follow. In other words, the replacement, the omission, the addition, or the exchanging of the sequence can be made on the components.

What is claimed is:

1. A machining time estimation device, comprising:
    a storage for storing machining program and machining setting,
    machining information acquiring unit for acquiring machining information on an operating condition of a machine tool adapted to be controlled on the basis of the machining program and the machining setting,
    varied element extraction unit for extracting an element varied between a plurality of said machining settings,
    effected block extraction unit for extracting an effected block the machining time of which is varied on the effect of the varied element,
    estimated reduction in time calculating unit for calculating on each effected block difference caused by the varied element and calculating estimated difference in time throughout the machining program, and
    machining time display unit for outputting the estimated difference in time, wherein
    the estimated reduction in time calculating unit is configured to calculate a reduction in time only for each effected block the machining time of which is varied due to the varied element.

2. The machining time estimation device in accordance with claim 1, wherein
    the estimated reduction in time calculating unit is adapted to calculate an estimated machining time after the adjustment of the machining setting on the basis of the machining time before the adjustment of the machining setting and the estimated difference in time.

3. The machining time estimation device in accordance with claim 1, wherein
    the machining information acquiring unit is adapted to measure on each block the machining time before adjusting the machining setting, and
    the obtained information is stored in the storage as machining information.

4. The machining time estimation device in accordance with claim 1, wherein the machining information acquiring unit is adapted to acquire the machining information from the machine tool operated under the machining program and the machining setting.

5. The machining time estimation device in accordance with claim 1, wherein
the machining information acquiring unit is adapted to acquire the machining information which is the result of simulation on the machining time under the machining program and the machining setting.

6. The machining time estimation device in accordance with claim 1, wherein
the machining setting includes a setting regarding overlapping, and the estimated reduction in time calculating unit is adapted to calculate the estimated difference in time due to the application of the overlapping.

7. The machining time estimation device in accordance with claim 1, wherein
the machining setting includes a setting regarding an in-position width, and
the estimated reduction in time calculating unit is adapted to calculate the estimated difference in time due to the variation of the in-position width.

8. The machining time estimation device, according to claim 1, wherein
the effected block extraction unit is configured to extract the effected block, which is included in the machining program, and the machining time of which is varied on the effect of the varied element.

9. The machining time estimation device, according to claim 1, wherein
the estimated reduction in time calculating unit is configured to calculate the estimated difference in time throughout the machining program from the calculated reduction in time for each effected block, without executing whole machining program again.

10. A machining time estimation device, comprising:
a storage for storing machining program and machining setting,
machining information acquiring unit for acquiring machining information on an operating condition of a machine tool adapted to be controlled on the basis of the machining program and the machining setting,
varied element extraction unit for extracting an element varied between a plurality of said machining settings,
effected block extraction unit for extracting an effected block the machining time of which is varied on the effect of the varied element,
estimated reduction in time calculating unit for calculating on each effected block difference caused by the varied element and calculate estimated difference in time throughout the machining program, and
machining time display unit for outputting the estimated difference in time, wherein
the machining setting includes a setting regarding traverse block overlapping,
before adjustment of the machining setting, a next block in the machining program commences after a velocity of an axis of the machine tool becomes zero in a current block of the machining program,
after the adjustment of the machining setting, the next block in the machining program commences when the velocity of the axis of the machine tool in the current block of the machining program is reduced to be equal to or less than determined threshold value greater than zero, and
the estimated reduction in time calculating unit is adapted to calculate a reduction in time due to the adjustment of the machining setting.

11. A machining time estimation device, comprising:
a storage for storing machining program and machining setting,
machining information acquiring unit for acquiring machining information on an operating condition of a machine tool adapted to be controlled on the basis of the machining program and the machining setting,
varied element extraction unit for extracting an element varied between a plurality of said machining settings,
effected block extraction unit for extracting an effected block the machining time of which is varied on the effect of the varied element,
estimated reduction in time calculating unit for calculating on each effected block difference caused by the varied element and calculate estimated difference in time throughout the machining program, and
machining time display unit for outputting the estimated difference in time, wherein the machining setting includes a setting regarding in-position width,
before adjustment of the machining setting, a next block in the machining program commences when a positional deviation in a current block of the machining program becomes smaller than a predetermined in-position width,
after the adjustment of the machining setting where the predetermined in-position width is increased, the next block in the machining program commences when the positional deviation in the current block of the machining program becomes smaller than the increased in-position width, and
the estimated reduction in time calculating unit is adapted to calculate a reduction in time due to the adjustment of the machining setting.

* * * * *